March 3, 1964 W. E. ARNOLD 3,122,820
METHOD OF MANUFACTURING A ROTOR FOR A DYNAMO-ELECTRIC MACHINE
Filed May 18, 1959
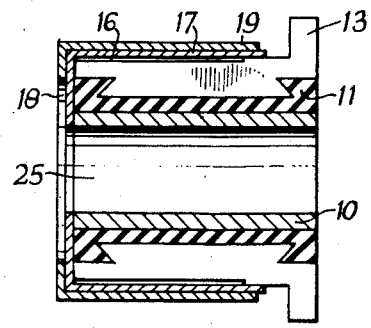
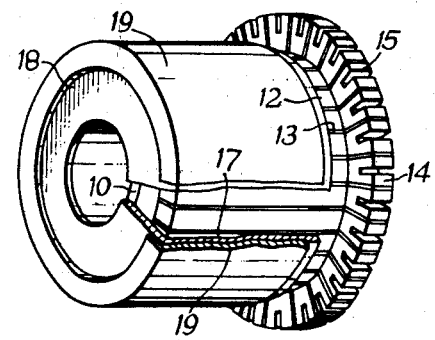
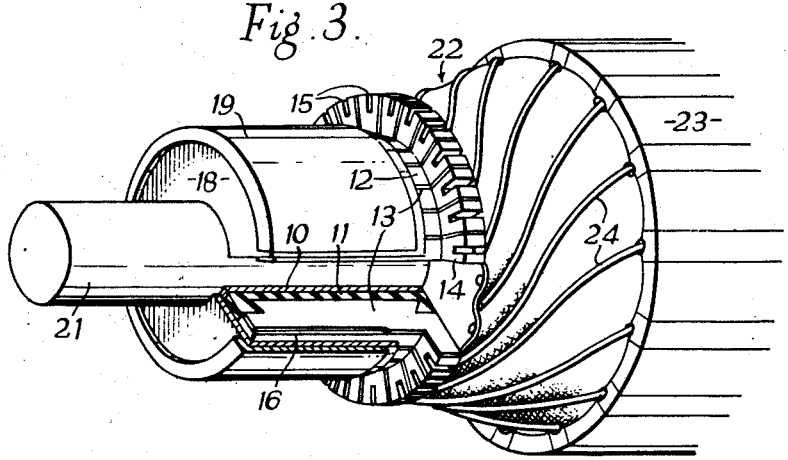
INVENTOR
WILLIAM ELI ARNOLD
BY
Craig and Freudenberg
ATTORNEYS United States Patent Office 3,122,820
Patented Mar. 3, 1964

3,122,820
METHOD OF MANUFACTURING A ROTOR FOR A DYNAMO-ELECTRIC MACHINE
William Eli Arnold, Old Beech Cottage, Dene Road, Ashtead, Surrey, England, assignor of one-half to Watliff Company Limited, London, England, a British company
Filed May 18, 1959, Ser. No. 813,892
Claims priority, application Great Britain May 30, 1958
4 Claims. (Cl. 29—155.53)

The present invention is concerned with improvements in and relating to commutators for dynamo-electric machines having a wound rotor, and in particular to a method of masking such commutators, to commutators masked by the method and to a method of manufacturing a rotor using commutators so masked. This invention is an improvement in or modification of the invention forming the subject of my co-pending application Serial No. 538,954, filed October 6, 1955, now U.S. Patent 2,915,658.

In the manufacture of a dynamo-electric machine having a wound rotor, a commutator is fitted on the shaft of a rotor having windings provided with terminal wires, and electrically conducting connections are made between the terminal wires and the conducting segments of the commutator. These connections are often made by dip-soldering, in which case substantially the whole of the commutator is immersed in the molten solder.

It is often required to impregnate the windings, at a later stage, with an electrically insulating composition, such as an insulating varnish or synthetic resin composition. This impregnation may be carried out by immersion of the rotor in a bath of the insulating composition by a dipping or double dipping process, or a vacuum impregnation process may be used in which insulating composition is forced into the windings by the release of a vacuum previously existing in a chamber containing a rotor of which the windings are coated with the composition.

In a later stage of the manufacture of a rotor, the commutator is finished, for example, by turning or grinding to remove excess solder which might otherwise form electrical connections between the segments.

In one form of commutator construction the conducting segments are separated by intersegment insulating material, and it is desirable that the surface of the intersegment insulating material should be recessed to a level below that of the brush surface of the segments. Intersegment recesses are commonly formed by making saw-cuts in the insulating material at the final stage in the manufacture of a rotor, but considerable advantages can be obtained if the intersegment recesses are formed during the manufacture of the commutator, that is, before it is fitted on the rotor shaft.

In another form of commutator construction a tube or disc of metal is anchored to a moulded core of insulating material and is divided into segments by saw cuts extending down to the core, thereby also forming intersegment recesses, though of a somewhat different kind.

The manufacture of a rotor using a commutator having intersegment recesses formed during the manufacture of the commutator usually suffers, however, from the disadvantage that solder may become lodged in the intersegment recesses during the soldering of the terminal wires to the segments. Retention of solder in the recesses will cause troubles such as short-circuiting in the finished rotor, and the removal of solder from the recesses is difficult and uncertain. Insulating composition may enter and collect in the recesses during the impregnation of the windings, and dirt may also become lodged in the recesses during the manufacture of the rotor.

It has now been found that a mask formed of a film of regenerated hydrate cellulose, when applied to a commutator in a water-swollen condition and then dried, will grip the commutator closely and prevent the entry of molten solder and insulating compositions into recesses covered by the mask, both in dip-soldering and in vacuum impregnation processes.

According to the present invention there is provided a method of masking a commutator of the type in which the insulating material is shaped to provide intersegment recesses between the parts of the conducting segments of the commutator which form the brush contacting surface of the commutator, to prevent the entry of solder or electrically insulating composition into the intersegment recesses when the commutator is dipped into a bath of molten solder or a bath of an electrically insulating composition during the manufacture of a rotor for a dynamo-electric machine, comprising the steps of applying to the commutator, in such a manner that the intersegment recesses are completely covered, a mask comprising a water-swollen film of regenerated hydrate cellulose, and drying the mask on the commutator so that it will fit tightly thereon and engage in close contact with those parts of the external surface of the commutator which lie round the periphery of the intersegment recesses.

The mask is preferably applied by fitting over the commutator a previously formed mask in a water-swollen condition, and the preferred material for such masks is film produced, by the viscose process, which not only has adequate wet strength and surprisingly can withstand exposure to molten solder for the necessary time, but is also cheap and readily obtainable.

The mask may have the form of a cap which covers the sides and the end of the commutator remote from the parts of the segments to which the terminal wires of the windings are to be connected. Two previously formed caps may be fitted, preferably by fitting a first cap on the commutator and then a second cap over the first. The second cap need not extend over the whole surface of the first. The second cap is more easily fitted over the first if the first cap is dried before fitting the second. This gives additional protection against mechanical damage to the masking, particularly at the edge between the sides and end of the commutator. A masked commutator provided with two such caps will withstand fairly rough handling.

One form of procedure for masking a commutator, and the use of the masked commutator in the manufacture of a rotor for a dynamo-electric machine, will now be described by way of example, with reference to the accompanying drawings, in which FIG. 1 is a cross section of a commutator masked according to the invention, FIG. 2 is a perspective view of the commutator shown in FIG. 1, and FIG. 3 is a perspective view of the commutator of FIGS. 1 and 2 mounted on a rotor.

A commutator is taken which comprises a metal sleeve 10 carrying a moulded synthetic resin core 11 in which are embedded conducting segments 12 and intersegment insulators 13. The segments are provided with lugs 14, which are all situated at one end of the commutator and are provided with slots 15. The intersegment insulators are shaped to provide intersegment recesses 16 which extend from the end of the commutator remote from the lugs towards, but not as far as, the lugs.

A damp, water-swollen cap 17 of viscose film, that is to say, a cap of viscose film which has been contacted with water until the film has become swollen by the impregnation of liquid therein and the overall dimensions of the cap are therefore greater than those of the cap in a dry condition, is then placed freely over the commutator, so that the crown portion 18 of the cap is in contact with the end of the commutator remote from the lugs, the sleeve-like sides of the cap being long enough to extend over the cylindrical surface of the commutator to cover completely the intersegment recesses and the adjacent brush-contacting surfaces of the segments. The liquid-impregnated cap is then dried in position on the commutator, either in air at room temperature, in a current of warm air, or by infra-red radiation, and a second cap 19 is then fitted over the first and dried similarly. During the drying operation the caps shrink and grip the commutator tightly.

The commutator is then fitted on the shaft 21 of a rotor 22, which is already provided with windings 23 having terminal wires 24. The shaft may be forced through the portions of the caps covering the bore of the sleeve, or these portions of the caps may be cut away before fitting the commutator on the shaft. Alternatively, as shown in the drawings, caps may be used which have holes provided in the crown to correspond with the bore 25 of the sleeve 10. The terminal wires 24 are then inserted into the appropriate slots 15 in the lugs 14. The rotor is then lowered, with its shaft vertical and the commutator lowermost, into a bath of molten solder at about 300° C. until the lugs 14 are beneath the surface of the solder. After a period of immersion sufficient to make the soldered connections, usually from 10 to 30 seconds, the rotor is withdrawn from the solder, and allowed to cool. The caps may become slightly discoloured by this immersion in molten solder, but no breakdown of the film or loss of its protective qualities occurs.

The rotor is vacuum dried, dipped in electrically insulating varnish to cover the windings and placed in a chamber which is then evacuated. Air is then readmitted to the chamber, and forces the varnish into the windings. The caps prevent the entry of varnish into the intersegment recesses during this process. The rotor is removed from the impregnation chamber and baked to harden the varnish. The electrical insulation between the segments of the commutators may then be tested before the caps are removed. The caps may then be stripped off the commutator, or, if desired, may be turned off on a lathe.

The advantages of the masks used in the method of masking a commutator according to the invention include cheapness and expendability, ease and convenience of application, tight and dependable sealing of the intersegment recesses against molten solder, insulating composition and dirt (effective in dip-soldering and vacuum impregnation processes), the possibility of electrical testing without the removal of the mask, and ease of removal of the mask by hand or machine. The masks, being made of a material which is a poor conductor of heat, also serve to protect commutators in a bath of molten solder from damage by heat, such as blistering of the resin core or annealing of the copper segments. In addition, a wide variety of sizes of commutator may be masked without a corresponding variety of masking apparatus. Fewer sizes of previously formed mask will suffice to cover a range of sizes of commutator, owing to the considerable shrinkage which occurs during drying of the water-swollen cellulose films. Moreover, water-swollen cellulose masks are more quickly and safely fitted than would be substantially rigid masks made to exact dimensions to fit a given size of commutator, since in the latter case great care would have to be taken to ensure a perfect fit and guard against damage or distortion of the mask.

I claim:

1. A method of manufacturing a rotor for a dynamo-electric machine including the steps of fitting a masked commutator to the shaft of a rotor having windings provided with terminal wires, said masked commutator comprising a plurality of conducting segments, insulating material between said segments shaped to provide intersegment recesses between the parts of said conducting segments which form the contacting surface of said commutator, and a tightly fitting mask of regenerated hydrate cellulose, produced by the viscose process, completely covering said intersegment recesses and said contacting surface except for exposed portions of said segments at one end, said mask engaging in close contact with those parts of the external surface of the commutator which lie round the periphery of the intersegment recesses and with said contacting surface, positioning the terminal wires adjacent said exposed portions of the conducting segments of the commutator, making electrically conducting connections between the terminal wires and said portions of the segments by dip-soldering, and removing the mask.

2. A method of manufacturing a rotor for a dynamo-electric machine including the steps of applying to a segmented commutator, of the type in which the insulating material is shaped to provide intersegment recesses between the parts of the conducting segments of the commutator which form the contacting surface of said commutator, a first mask having the form of a cap and consisting of a water-swollen film of regenerated hydrate cellulose, made by the viscose process, in such a manner that said contacting surface and intersegment recesses are completely covered except for exposed portions of said segments at one end with a crown portion of said cap covering the ends of said segments remote from said exposed portions, drying the mask on the commutator so that it will fit tightly thereon and engage in close contact with those parts of the external surface of the commutator which lie round the periphery of the intersegment recesses and with said contacting surface, thereafter applying and drying in like manner a second mask having the form of a cap over the first mask, fitting the thus masked commutator to the shaft of a rotor having windings provided with terminal wires, positioning the terminal wires adjacent said exposed portions, making electrically conducting connections between said terminal wires and said portions by dip-soldering, and thereafter impregnating as by immersion said windings with an electrically insulating composition, and removing said masks.

3. A method for manufacturing a rotor for a dynamo-electric machine including the steps of fitting a masked commutator to the shaft of a rotor having windings provided with terminal wires, said masked commutator comprising a plurality of conducting segments, insulating material between said segments shaped to provide inter-segment recesses between the parts of said conducting segments which form the contacting surface of said commutator, and a tightly fitting mask of regenerated hydrate cellulose, completely covering said inter-segment recesses and said contacting surface except for exposed portions of said segments at one end, said mask engaging in close contact with those parts of the external surface of the commutator which lie round the periphery of the inter-segment recesses and with said contacting surface, positioning the terminal wires adjacent said exposed portions of the conducting segments of the commutator, making electrically conducting connections between the terminal wires and said portions of the segments by dip-soldering, and thereafter impregnating as by immersion said windings with an electrically insulating composition and removing said mask.

4. A method of manufacturing a rotor for a dynamo-electric machine including the steps of applying to a segmented commutator, of the type in which the insulating material is shaped to provide inter-segment recesses between the parts of the conducting segments of the commutator which form the contacting surface of said commutator, a first mask having the form of a cap and consisting of a water-swollen film of regenerated hydrate cellulose, in such a manner that said contacting surface and inter-segment recesses are completely covered except for exposed portions of said segments at one end with a crown portion of said cap covering the ends of said segments remote from said exposed portions, drying the mask on the commutator so that it will fit tightly thereon and engage in close contact with those parts of the external surface of the commutator which lie round the periphery of the inter-segment recesses and with said contacting surface, thereafter applying and drying in like manner a second mask having the form of a cap over the first mask, fitting the thus masked commutator to the shaft of a rotor having windings provided with terminal wires, positioning the terminal wires adjacent said exposed portions, making electrically conducting connections between said terminal wires and said portions by dip-soldering, and removing said masks.

References Cited in the file of this patent

UNITED STATES PATENTS

| | | |
|---|---|---|
| 2,118,073 | Dittmeyer | May 24, 1938 |
| 2,183,691 | Owens | Dec. 19, 1939 |
| 2,264,703 | Lenz | Dec. 2, 1941 |
| 2,483,024 | Roters | Sept. 27, 1949 |
| 2,703,270 | Studer et al. | Mar. 1, 1955 |
| 2,740,193 | Pessel | Apr. 3, 1956 |
| 2,915,658 | Arnold | Dec. 1, 1959 |

FOREIGN PATENTS

| | | |
|---|---|---|
| 512,765 | Belgium | July 31, 1952 |
| 558,088 | Canada | May 27, 1958 |